United States Patent [19]
Glennon

[11] Patent Number: 4,507,724
[45] Date of Patent: Mar. 26, 1985

[54] PULSE WIDTH MODULATED INVERTER FOR UNBALANCED AND VARIABLE POWER FACTOR LOADS

[75] Inventor: Timothy F. Glennon, Rockford, Ill.

[73] Assignee: Sundstrand Corporation, Rockford, Ill.

[21] Appl. No.: 542,578

[22] Filed: Oct. 17, 1983

[51] Int. Cl.³ .................................. H02P 13/20
[52] U.S. Cl. ........................... 363/98; 363/41; 363/132
[58] Field of Search .......... 363/17, 35, 37, 40–43, 363/55–58, 80, 95, 97–98, 131–139

[56] References Cited

U.S. PATENT DOCUMENTS

| | | | |
|---|---|---|---|
| 3,423,662 | 1/1969 | Schlabach et al. | 363/41 |
| 3,775,663 | 11/1973 | Turnbull | 363/41 |
| 3,970,916 | 7/1976 | Kienscherf | 363/41 X |
| 4,032,831 | 6/1977 | Nabae et al. | 363/41 X |
| 4,162,525 | 7/1979 | Epp | 363/41 X |
| 4,310,866 | 1/1982 | Wirth | 363/132 X |
| 4,443,841 | 4/1984 | Mikami et al. | 363/41 |
| 4,446,513 | 5/1984 | Clenet | 363/132 |

Primary Examiner—Peter S. Wong
Attorney, Agent, or Firm—Wood, Dalton, Phillips, Mason & Rowe

[57] ABSTRACT

An n-phase inverter for developing polyphase AC power from DC power developed by a DC source over first and second DC bus lines and a neutral line includes circuitry for preventing the return of regenerative currents developed by a load connected to the output of the inverter to the DC source. The circuitry includes means for sensing the presence of regenerative currents, and switches which are operated when a regenerative current is sensed to disconnect the DC source from the inverter and to shunt the regenerative current back to the load. The inverter may therefore be used with DC sources which cannot accept regenerative currents. Furthermore, the size of a DC bus filter between the DC source and the inverter may be substantially reduced.

13 Claims, 3 Drawing Figures

PULSE WIDTH MODULATED INVERTER FOR UNBALANCED AND VARIABLE POWER FACTOR LOADS

DESCRIPTION

1. Background of the Invention

The present invention relates generally to inverters for developing polyphase AC power from DC power, and more particularly to an inverter which includes circuitry to minimize the return of regenerative currents back to the source of DC power.

Static inverters for converting DC power into polyphase AC power typically include n pairs of switches connected across first and second voltage levels on a DC bus. A free wheeling diode is connected across each of the switches in the inverter to provide a path for currents to flow as the switches are opened and closed in response to pulse width modulation, or PWM control.

When such inverters are used to drive unbalanced or variable power factor loads having an inductive reactance, reverse or regenerative currents often are developed in the load and are coupled through the free wheeling diodes over the the DC bus back to the source of DC power. Consequently, such inverters require relatively large DC bus filters to accept the regenerative current so that such inverters can be used with sources of DC power which cannot accept regenerative currents. Accordingly, a power supply utilizing such an inverter must be unduly large and heavy.

2. Summary of the Invention

In accordance with the present invention, a static n-phase inverter for converting DC power from a DC source into polyphase AC power includes means for circulating reverse or regenerative currents developed by a load connected to the output of the inverter through the load so that such current is not returned to the source of DC power.

The n-phase inverter for energizing a polyphase load comprises n pairs of switches connected across first and second rails. The rails receive first and second voltages from a DC source on first and second DC bus lines, respectively. An (n+1)th pair of switches is also connected across the first and second rails with the midpoint or junction between the two switches being connected by a neutral line to a neutral potential of the DC source. The load has n-phase inputs connected to junctions between switches of each pair and has a neutral connection coupled to the junction of the (n+1)th pair.

First and second bus switches connect the first and second rails to the first and second bus lines. A first current sensor is disposed in the first rail while a second current sensor is disposed in the second rail. The current sensors are connected to switch control apparatus for operating the first and second bus switches and the (n+1)th pair of switches.

Under normal operating conditions of the inverter, i.e. when no regenerative currents are flowing, the current in each of the first and second rails is in a first direction. When the current in either of these rails changes to a direction opposite the first direction, as sensed by a current sensor, the switch control associated with such current sensor opens the bus switch between that rail and the associated bus lines to disconnect the DC source from that rail. Further, one of the switches of the (n+1)th pair is closed to connect that rail carrying the reverse current to the neutral line. The reverse current is therefore shunted away from the source of DC potential and is recirculated through the load.

Since the DC source is isolated from such reverse or regenerative currents, the size of the DC bus filter can be reduced. Furthermore, the inverter can be used with sources of DC power which cannot accept regenerative currents, such as lithium thionyl chloride batteries.

DESCRIPTION OF THE PREFERRED EMBODIMENT

Figure 1:
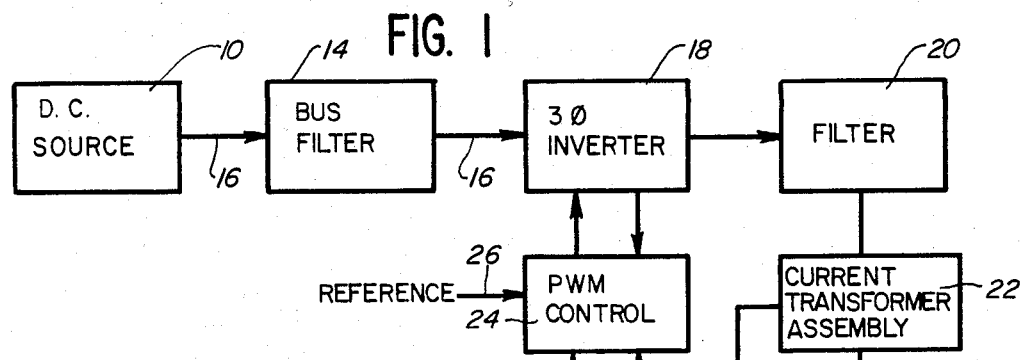
FIG. 1 is a block diagram of a system for developing polyphase AC power from DC power developed by a DC source.

Referring now to FIG. 1, there is illustrated an n-phase inverter system which converts DC power developed by a DC source 10 into polyphase AC power to drive a load 12. The inverter system shown in the drawings has been illustrated as a three-phase inverter system for driving a three-phase load; however, it should be understood that the present invention is in no way limited to a three-phase inverter but may be used in conjunction with an n-phase inverter, where n may be an integer greater than or equal to one.

The DC source may be a generator and rectifier arrangement which includes control and protection circuitry for operating the generator. Alternatively, the DC source 10 may simply be a battery or other source of DC potential. In any event, the source 10 includes two terminals at first and second voltages and a neutral or common terminal which is at a voltage midway between the first and second voltages.

The output from the source 10 is coupled through a bus filter 14 over DC bus lines 16 to an inverter 18. The inverter 18 develops three-phase AC power from the DC power on the lines 16, in a manner more specifically noted below.

The inverter 18 is connected through a filter 20 and a current transformer assembly 22 to the load 12. A current sensing signal is developed by the current transformer assembly 22 and is coupled to a pulse width modulation, or PWM control 24 which controls switches in the inverter 18. The PWM control 24 also receives signals representing the line-to-neutral voltages of each of the phases delivered to the load 12 as well as a reference signal on a line 26.

The PWM control 24 is conventional and provides time ratio control for the switches in the inverter 18.

Figure 2:
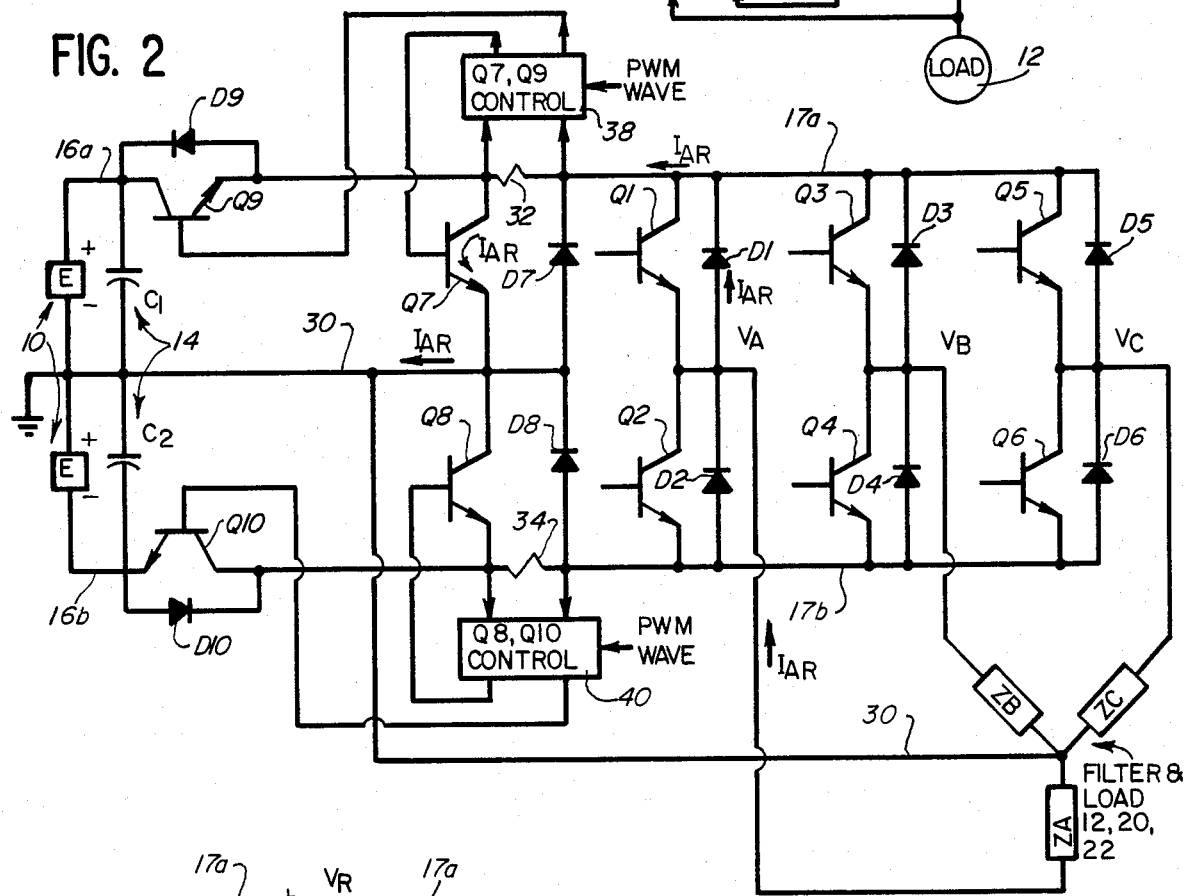
FIG. 2 is a schematic diagram of the static three-phase inverter shown in block diagram form in FIG. 1.

Referring now to FIG. 2, there is illustrated the DC source 10 and the bus filter 14 in conjunction with the inverter 18.

The inverter stage 18 includes n pairs of switches connected across first and second rails 17a, 17b which are coupled to first and second DC bus lines 16a and 16b, respectively. In the illustrated example, n is equal to three, although n may be equal to another number, as previously noted.

The three pairs of switches are in the form of bipolar switching transistors, designated Q1–Q6. Very fast switching (100–200 nS) MOSFET transistors can be substituted for the bipolar transistors, if desired, to enhance operational capability. Each transistor has connected across the collector-emitter circuit thereof a free wheeling diode D1-D6, respectively. Three phase voltages, designated $V_A$, $V_B$ and $V_C$ are developed at the junctions between the transistors of each pair and are connected to the load 12. For purposes of illustration, the impedances of the filter 20, the current transformers 22 and the load 12 are shown as lumped phase impedances $Z_A$, $Z_B$ and $Z_C$. A neutral connection of the load 12 is connected to the neutral voltage of the DC source 10 over a neutral bus line 30.

An (n+1)th pair of switches (i.e. a fourth pair of switches in the illustrated example) is connected across the rails 17a,17b with the junction therebetween being connected to the neutral line 30. The switches of this pair are in the form of bipolar transistors Q7 and Q8.

First and second current sensors 32,34 are connected in the path of the first and second rails 17a, 17b, respectively. The current sensors 32,34 in the preferred embodiment comprise resistors; however, other types of current sensors, such as Hall effect current sensors, may be used.

A pair of diodes D7,D8 are connected between the neutral bus line 30 and the first and second rails 17a,17b, respectively, such that the current sensor 32 is connected between the collector of the transistor Q7 and the diode D7 and so that the current sensor 34 is connected between the emitter of the transistor Q8 and the diode D8.

First and second DC bus switches connect the first and second bus lines 16a,16b to the first and second rails 17a,17b, respectively. These switches comprise transistors Q9 and Q10 each having a diode D9 or D10 connected across the collector emitter circuits thereof. The transistors Q9,Q10 are operated to disconnect one or both of the rails 17a,17b from the DC source 10 when a reverse or regenerative current is sensed therein by either of the current sensors 32,34. Also, one or both of the transistors Q7 and Q8 is turned on to shunt the reverse current to the neutral line 30 in order to return the current back to the load. Control of the transistors Q7-Q10 is effected by control circuits 38,40, one of which is shown in greater detail in FIG. 3.

Figure 3:
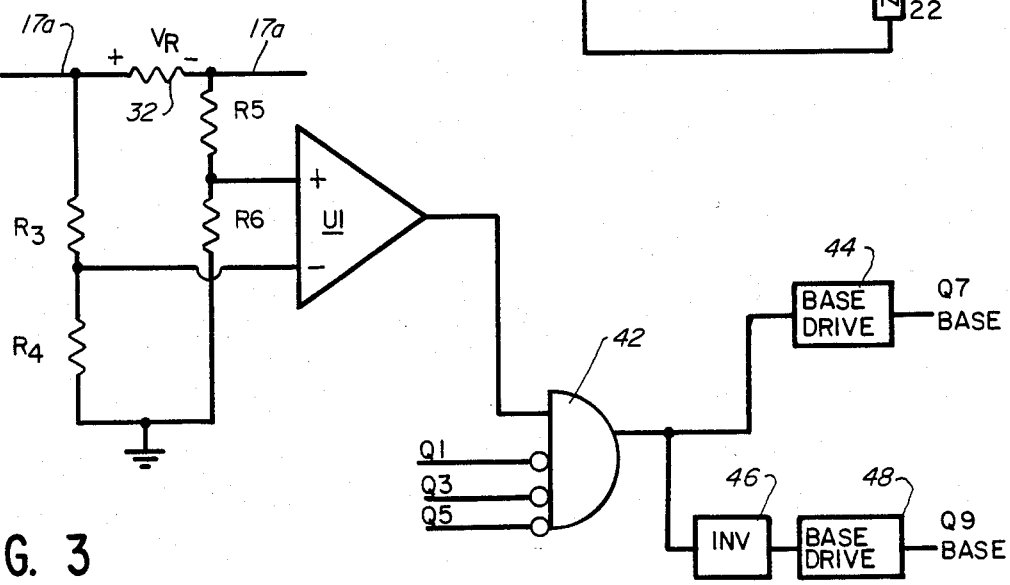
FIG. 3 is a schematic diagram of one of the control circuits shown in block diagram form in FIG. 2.

Referring now to FIG. 3, except as noted otherwise below, the control circuits 38,40 are substantially identical and hence only the control circuit 38 is described in detail.

The voltage across the current sensor 32 is applied to inverting and noninverting inputs of a comparator comprising an operational amplifier U1 through voltage dividers consisting of resistors R3 and R4 and resistors R5 and R6. The operational amplifier U1 develops a comparison signal which is connected to an AND gate 42 which receives inverted versions of three pulse width modulated switching signals for the transistors Q1, Q3 and Q5, such signals being developed by the PWM control 24 shown in FIG. 1.

The AND gate 42 develops a control signal which is connected to a first optically coupled base drive circuit 44 to operate the transistor Q7. The control signal is also connected through an inverter 46 to a second base drive circuit 48 to operate the transistor Q9.

As illustrated in FIG. 3, when the voltage at the noninverting input of U1 is less than the voltage at the inverting input thereof (in response to a first direction of current in the rail 17a indicating normal operation of the inverter) the output of the operational amplifier U1 is in a low state, thereby causing the control signal generated by the AND gate 42 to also be in a low state. This low state control signal turns off the transistor Q7 and turns on the transistor Q9 so that the DC source 10 remains connected to the inverter 18 through the rail 17a and allows normal inverter operation.

On the other hand, assume that a regenerative or reverse current $I_{AR}$ is developed in phase A of the load. This condition would arise when the load is an unbalanced one with infinite impedance in phases B and C and a highly inductive reactance in phase A. Such a current may exit phase A and be conducted through the diode D1 and the current sensor 32. When the current through the current sensor 32 reverses direction, i.e. the voltage at the noninverting input of the operational amplifier U1 exceeds the voltage at the inverting input thereof, the output of the operational amplifier U1 assumes a high state. This high state comparison signal is combined with the PWM waves in the AND gate 42 to produce a high state control signal when the noninverted version of all three switching signals are in a low state. It should be noted that during those times that the PWM wave is in a low state, transistors Q1, Q3 and Q5 in the inverter are off, such operation being a result of the pulse width modulation control of the inverter.

The high state control signal developed by the AND gate 42 is connected through the base drive circuit 44, the inverter 46 and the second base drive circuit 48 to turn on the transistor Q7 and turn off the transistor Q9. As seen in FIG. 2, when the transistor Q9 is turned off and Q7 turned on, the diode D9 is reverse biased and hence the source of DC power is disconnected from the first rail 17a to prevent the reverse or regenerative current $I_{AR}$ from being returned to the source 10. Additionally, when the transistor Q7 is turned on, the regenerative current $I_{AR}$ is shunted from the first rail 17a through the transistor Q7 to the neutral line 30 for return to the load. The route the regenerative current $I_{AR}$ takes through the circuit is marked by the arrows.

The control circuit 40, as previously noted, is identical to the control circuit 38 with the following exceptions: the current sensor 34 is connected in the second rail 17b and is substituted for the current sensor 32; the transistor Q8 is substituted for the transistor Q7 and the transistor Q10 is substituted for the transistor Q9; the illustrated polarity of the voltage across the current sensor is opposite to that shown in FIG. 3; and, the AND gate inputs are coupled to inverted versions of the switching signals for the transistors Q2, Q4 and Q6 instead of the inverted switching signals for the transistors Q1, Q3 and Q5. In all other respects, the circuits are identical and operate to connect a low impedance path from one or both of the rails 17a,17b to the neutral connection 30 so as to prevent regenerative currents from being returned to the DC source.

It should be noted that the normal PWM control of the inverter is unaffected by the present invention. Also, the present invention is operative to connect a low impedance path between one of the rails 17 and the neutral line and to disconnect the DC source from the rail only when all of the switches associated with that rail in the inverter are off. This operation is previously described with respect to the function of the AND gate 42 in connection with FIG. 3.

Furthermore, the present invention may be utilized with single-ended DC power supplies which have two terminals coupled to the inverter rails, in which case the two transistors Q7 and Q8 would be replaced by a single transistor connected between the rails and operated as noted above. The transistors Q9 and Q10 would likewise be replaced by a single transistor.

By minimizing the return of regenerative currents to the DC source, the size of the bus filter 14 may be reduced. Furthermore, the instant invention may be used to allow operation of an inverter by a source which cannot accept regenerative currents, thereby allowing the inverter to be used with a wider range of DC sources.

What is claimed is:

1. In an n-phase inverter for generating polyphase AC power from a DC source having two terminals coupled to the inverter through bus lines, the inverter having rails coupled to the bus lines and outputs connected to a load, the improvement comprising:
   a first switch connected between one of the bus lines and one of the rails;
   a second switch coupled between the one rail and the other bus line;
   means coupled to the one rail for sensing the direction of current therein, such current being in a particular direction when power developed by the load attempts to return to the DC source; and
   means coupled to the sensing means and to the first and second switches for operating the switches whereby the first switch is opened and the second switch is closed to shunt current through the second switch from the one rail when the current in the one rail flows in the particular direction to thereby prevent such current from being returned to the DC source.

2. The improvement of claim 1, wherein the sensing means comprises a resistor connected between the one rail and the one bus line.

3. The improvement of claim 1, wherein the operating means includes a comparator having first and second inputs connected across the sensing means and an output which assumes a certain state when the current therethrough flows in the particular direction.

4. The improvement of claim 3, wherein the operating means further includes first and second voltage dividers each comprising two series connected resistors having a junction between such resistors, the first voltage divider being connected to one side of the sensing means and the second voltage divider being connected to the other side of the sensing means and the junctions of the first and second voltage dividers being connected to the first and second comparator inputs, respectively.

5. The improvement of claim 3, wherein the inverter is selectively operated by a pulse width modulated, or PWM, wave switching between high and low states, the operating means further including means coupled to the PWM wave and to the comparator output for generating a control signal when the PWM wave is in a low state and the comparator output assumes the certain state.

6. The improvement of claim 5, wherein the operating means further includes means coupled to the generating means and to the second switch for closing the second switch when the control signal is generated, an inverter connected to the generating means for inverting the control signal and means coupled to the inverter and the first switch for opening the first switch when the control signal is generated.

7. The improvement of claim 1, wherein the first and second switches are transistors.

8. In a three-phase inverter for generating three-phase AC power from a DC source having first and second terminals, the first terminal being coupled to the inverter through a DC bus line, the second terminal being connected to the inverter and to a load, the inverter including a rail, a first switch connected between the rail and the DC bus line, a second switch connected between the rail and the second terminal, a current sensor for sensing current in the rail and means connected to the current sensor for controlling the first and second switches, a method of preventing regenerative current developed by the load from being returned to the DC source, the method comprising:
   utilizing the current sensor to detect the presence of regenerative current in the rail; and
   operating the controlling means to open the first switch and close the second switch when a regenerative current in the rail is detected to shunt such current through the load to thereby prevent such current from being returned to the DC source.

9. The method of claim 8, wherein the controlling means includes means for sensing the direction of current in the rail and wherein the utilizing step includes the step of detecting when the current in the rail is in a certain direction indicative of the presence of regenerative current.

10. The method of claim 8, wherein the current sensor develops a voltage on either side thereof and wherein the utilizing step includes the steps of:
    comparing the voltage on one side of the current sensor with the voltage on the other side of the sensor; and
    generating a comparison signal in accordance with the comparison which assumes a certain state when the voltage on the one side exceeds the voltage on the other side.

11. The method of claim 10, wherein the inverter is controlled by a pulse width modulated, or PWM, wave switching between first and second states and wherein the operating step includes the steps of inverting the PWM wave and combining in an AND gate the inverted PWM wave and the comparison signal to derive a control signal for the first and second switches.

12. The method of claim 11, wherein the operating step further includes the steps of coupling the control signal to the second switch, inverting the control signal and coupling the inverted control signal to the first switch.

13. In a three-phase static inverter for generating three-phase AC power from DC power developed by a DC source having two terminals and a neutral terminal coupled to the inverter over two DC bus lines and a neutral line, respectively, the inverter and the neutral line being connected to a load, the inverter including first and second rails coupled to the first and second DC bus lines, respectively, and operated by a pulse width modulated, or PWM, wave switching between first and second states, apparatus for preventing regenerative currents developed in the load from being returned to the DC source, comprising:
   a first switch between the first bus line and the first rail;
   a second switch connected between the first rail and the neutral line;
   a third switch between the second bus line and the second rail;
   a fourth switch connected between the second rail and the neutral line;

first means coupled to the first rail for sensing the presence of regenerative currents therein;

second means coupled to the second rail for sensing the presence of regenerative currents therein;

first switch operating means coupled to the first sensing means and to the first and second switches for operating the switches whereby the first switch is opened and the second switch is closed when a regenerative current is sensed in the first rail and the PWM wave is in the first state to shunt current away from the DC source and through the second switch, the neutral line and the load; and second switch operating means coupled to the second sensing means and to the third and fourth switches for operating the switches whereby the third switch is opened and the fourth switch is closed when a regenerative current is sensed in the second rail and the PWM wave is in the first state to shunt current away from the DC source and through the fourth switch, the neutral line and the load.

* * * * *